No. 718,411. PATENTED JAN. 13, 1903.
E. ADAM.
APPARATUS FOR DISPENSING GAS IMPREGNATED BEVERAGES.
APPLICATION FILED AUG. 6, 1902.
NO MODEL. 3 SHEETS—SHEET 1.

WITNESSES: INVENTOR:
Henry King. Edwin Adam,
Russell M. Everett. BY
Drake & Co.
ATTORNEYS.

THE NORRIS PETERS CO., PHOTO-LITHO., WASHINGTON, D. C.

No. 718,411. PATENTED JAN. 13, 1903.
E. ADAM.
APPARATUS FOR DISPENSING GAS IMPREGNATED BEVERAGES.
APPLICATION FILED AUG. 6, 1902.
NO MODEL. 3 SHEETS—SHEET 2.

WITNESSES:
Henry Krug
Russell M. Everett

INVENTOR
Edwin Adam,
BY
Draket G.
ATTORNEYS.

No. 718,411. PATENTED JAN. 13, 1903.
E. ADAM.
APPARATUS FOR DISPENSING GAS IMPREGNATED BEVERAGES.
APPLICATION FILED AUG. 6, 1902.
NO MODEL. 3 SHEETS—SHEET 3.

WITNESSES:
Russell M. Everett
C. B. Pitney

INVENTOR
Edwin Adam,
BY
Draket Co.
ATTORNEYS

UNITED STATES PATENT OFFICE.

EDWIN ADAM, OF NEWARK, NEW JERSEY.

APPARATUS FOR DISPENSING GAS-IMPREGNATED BEVERAGES.

SPECIFICATION forming part of Letters Patent No. 718,411, dated January 13, 1903.

Application filed August 6, 1902. Serial No. 118,631. (No model.)

*To all whom it may concern:*

Be it known that I, EDWIN ADAM, a citizen of the United States, residing at Newark, in the county of Essex and State of New Jersey, have invented certain new and useful Improvements in Apparatus for Dispensing Gas-Impregnated Beverages; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to enliven and cool beer or other gas-impregnated beverages in the process of drawing it from the supply-packages and dispensing it for consumption, to prevent the presence of unabsorbed gas in the liquid when drawn, and to secure other advantages and results, some of which may be referred to hereinafter in connection with the description of the working parts.

The invention consists in the improved apparatus for dispensing beer or other gas-impregnated liquids and in the arrangements and combinations of parts of the same, all substantially as will be hereinafter set forth and finally embraced in the clauses of the claim.

Figure 1:
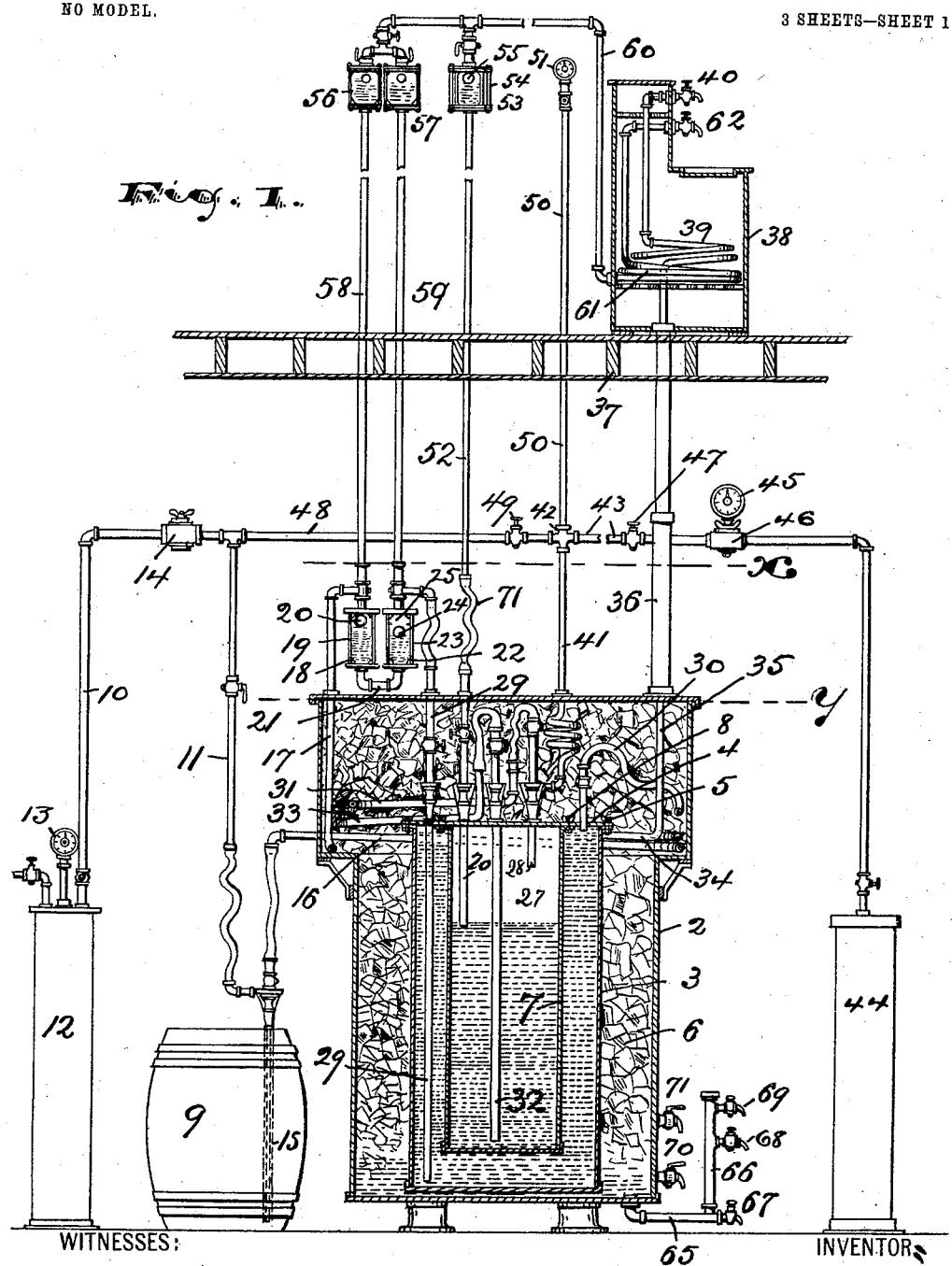
Figure 2:
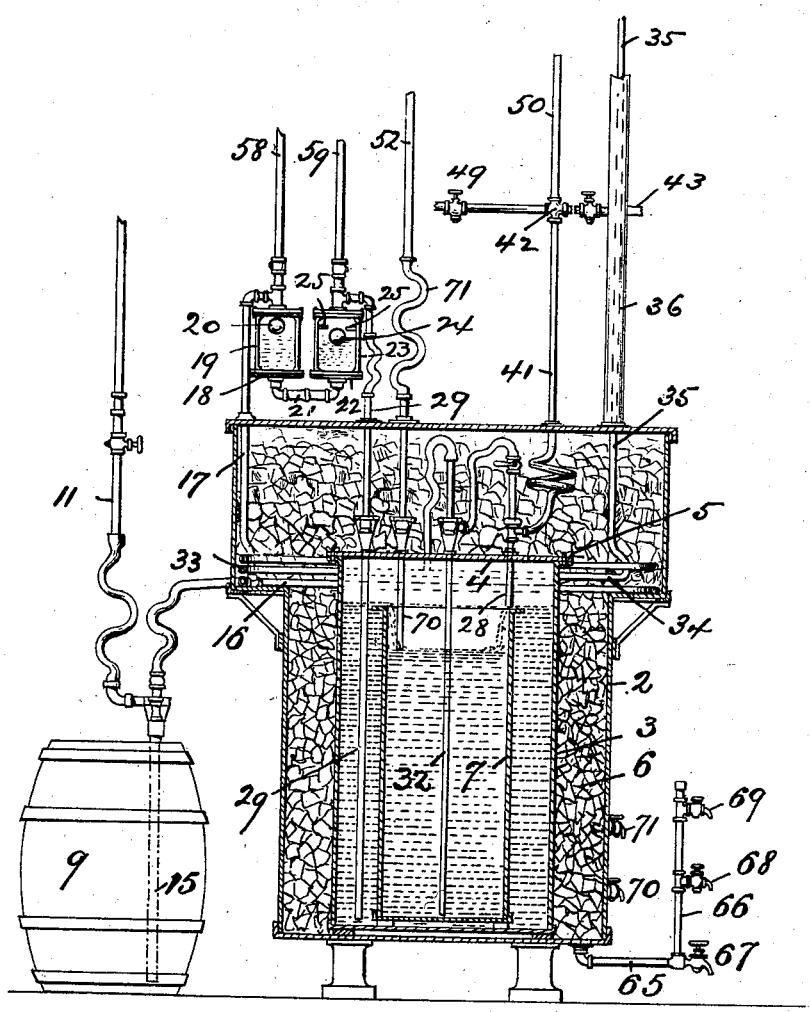
Figure 3:
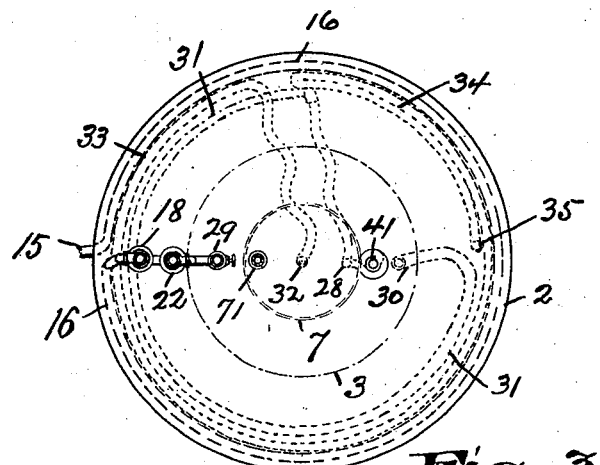
Figure 4:
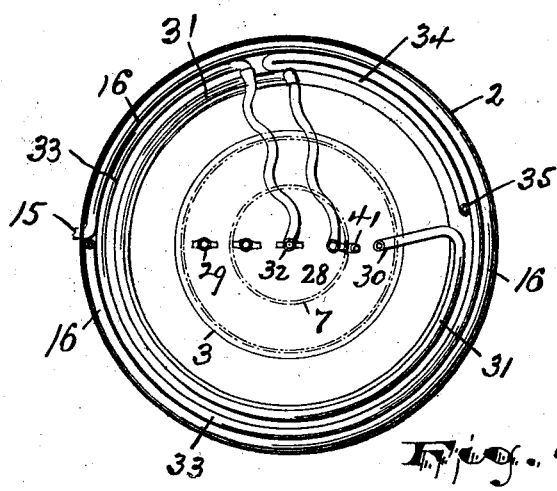

Referring to the accompanying drawings, in which like numerals of reference indicate corresponding parts in each of the several figures, Figure 1 is a side elevation of my improved apparatus with the ice-drum and contained reservoir in section. Fig. 2 is a similar view of the apparatus adapted to winter use; and Figs. 3 and 4 are horizontal sections on lines $x$ and $y$, respectively, Fig. 1, showing the ice-drum and reservoir and relative arrangement of pipes in plan.

In said drawings, 2 indicates an ice-drum, within which a smaller reservoir 3 is set, as shown. Said reservoir has a lid or cover 4, adapted to be made air-tight by clamping-screws 5, and the space around and above said reservoir is for cracked ice 6. Within the said reservoir 3 is a centrally-disposed smaller tank 7, which is preferably clamped at its upper edges imperviously to the under side of the lid or cover 4, as by screws 8 in Fig. 1, whereby said tank is suspended from said cover.

9 indicates a cask or other package of liquid into which compressed air passes through pipes 10 11 from a receiver 12, provided with a pressure-gage 13 and a reducing-valve 14 in the pipe 10. Under this pressure, which is about fifteen pounds, more or less, the liquid is forced out of the cask through the slip-rod 15, through a coil 16 in the upper part of the ice-chamber, and from thence by a pipe 17, opening out at the top of the ice-chamber to an air-check valve 18. Said air-check valve comprises an upright glass 19, with a float-valve 20 therein, adapted to be seated at the bottom. From the lower end of said check-valve 18 a U-shaped pipe 21 extends to the lower end of a gas-check valve 22, comprising a similar glass 23, arranged alongside the air-check valve 18 and having in itself a float-valve 24, adapted to be seated at the bottom of the glass and being held away from the top by lugs 25. From the upper end of said check-valve 22 extends a flow-pipe 29 downward into the reservoir 3, said flow-pipe making an impervious connection with the cover 4 thereof and extending to or nearly to the bottom of the reservoir. From the top of said reservoir 3 and preferably at the opposite side from where the pipe 29 enters leads an exit-pipe 30, which coils around the upper part of the ice-chamber, as at 31, and then passes through the cover 4 of the reservoir 3 and opens into the tank 7, as at 28, without projecting very far thereinto. An exit-pipe 32, the lower end of which is close to the bottom of the tank 7, also leads from said tank through the cover 4, and after coiling around the ice-chamber, as at 33 34, extends upward out of the ice-chamber, as at 35, and being surrounded by a jacket 36 passes up through the floor 37 of the bar-room to the bar 38. Within the bar said pipe is coiled, as at 39, to receive ice and prevent a warm pipeful of beer and beyond terminates in an ordinary draw-spigot 40.

Into the top of the inner tank 7 opens a gas-pipe 41, which preferably above the said tank branches, as at 42, four ways. One lateral branch 43 extends to a cylinder 44 and is provided with a gage 45, reducing-valve 46, and stop-cock 47. The other lateral branch 48 connects with the air-pipe 10 for forcing a supply of liquid out of the cask 9, so that when desired air can be introduced to the reservoir through the pipe 41 to blow out all the liquid or beer, a stop-cock 49 enabling said branch to be ordinarily closed. The upright branch 50 carries at the top a pressure-gage 51 at a point convenient to the bartender.

A relief or vent pipe 52 extends through the top of the tank 7 and is slidable therein, so that its lower end can be made to project a greater or less distance into the tank. Its upper end extends through the floor 37 up to a point convenient to the bar, where it is provided with a vent-valve 53, comprising a glass 54 with a float or ball 55, adapted to be seated at the top of the glass. Similar vent-valves 56 and 57 are situated near by and connected, respectively, by pipes 58 59 to the air-check valve 18 and gas-check 22. All these vent-valves open into a common relief outlet-pipe 60, which after forming a coil 61 beneath the bar 38, as does the flow-pipe 35, terminates in a spigot 62 at the bar.

The temperature of the refrigerating-tank 2 is controlled in a measure by the disposition of the drippings from the melted ice at the bottom of said tank. A pipe 65 leads from the extreme bottom of the tank and then extends upward, as at 66, said upward portion being provided with cocks 67, 68, and 69. According as one or another of said cocks is opened a greater or less depth of water stands in the bottom of the tank 2; but in any event there is a circulation of such water to its bottom. In case it is desired to leave a perfectly dead body of water in the bottom of the tank 2 drip-cocks 70 71, located directly in the side of the tank, are employed.

In the operation of my improved apparatus, the valves 47 and 49 being closed and a barrel or cask of liquid suitably connected, a pressure of fifteen pounds, more or less, of air is admitted from the cylinder 12, and a stream of liquid flows through the pipe 15, refrigerating-coil 16, pipe 17, check-valves 18 and 22, and pipe 29 to the bottom of the receiver 3. When said receiver is filled, the liquid flows out through the pipe 30, through the refrigerating-coil 31, and into the inner tank 7 by the pipe 28. As said inner tank fills the air therein escapes through the vent-pipes 52 60 and out at the spigot 62, which has been left open for this purpose. When the tank is fully vented, the liquid rises in pipe 52 and closes vent-valve 53. Then flow continues from the tank 7 through pipe 32, cooling-coils 33 34, and pipe 35 to the draw-spigot 40. After the several chambers and pipes are once full there is no flow unless drawing from the spigot 40 takes place, when an amount leaves the supply-cask 9 equal to the amount drawn. After the inner tank 7 is full of liquid the vent-pipe 52 is pushed down into the tank, as shown in Fig. 1, whereupon the gas, which naturally escapes from the liquid, will become entrapped in the top of the tank 7 and accumulates there, as indicated in Fig. 1, forcing the surface of the liquid down to the level of the end of said vent-pipe 52 and providing a gas-space 27 for the entering liquid to drop through from the pipe 28. To this end the lower portion 70 of the vent-pipe is slidably seated in the cover 4 of the tank and connected to the main portion 52 by a flexible hose 71. Thus the volume of gas in the top of the tank 7 can be controlled. The pipe 28 is similarly made slidable in the cover 4, and thus the distance which the entering stream of liquid falls through the gas-space can be regulated.

Obviously instead of utilizing the surplus gas of the liquid to form the gas-space at the top of the tank 7 gas may be directly introduced from the cylinder 44 through the pipes 43 41 by opening the valve 47, and, if desired, this could be done before any liquid entered the tank 7, so that it would be originally filled against gas-pressure instead of atmospheric pressure. In any event such gas-pressure must be less than the air-pressure, which creates the flow of liquid.

When the supply-cask 9 is emptied, air follows over to the air-check valve 18, and the float-valve 20 is seated after the vent-valve 56 above has been filled with air and its liquid driven out. The bartender at once notices said vent-valve 56 and goes and connects on a new cask. He then opens the relief-spigot 62 until liquid appears in the vent-valve 56 and a normal flow is again set up.

If it should ever happen that because of a leaky barrel or other reason the gas-pressure in the tank 7 should become greater than the liquid-flow pressure, so that the liquid backed up toward the supply-barrel, the ball 24 in the gas-check valve 22 will as soon as the liquid has been driven out of said valve and the vent-valve above be seated and stop any further backflow. The bartender then notices by the empty glass of the vent-valve 57 that something is wrong and investigates.

It will be noticed that the movement of the liquid in the receiver 3 is upward or directly opposite to the current in the ice-chamber, and thus a maximum cooling is secured.

The tubes entering the receiver 3 and tank 7 are all made vertically slidable in the cover 4, and thus adjustable, as was described in connection with tubes 70 and 28, and hence by raising or lowering said tubes the temperature of the liquid may be to some extent controlled, because of the portion left undisturbed or dead.

For winter use when not so much refrigerating is necessary I prefer to detach the inner tank 7 from the cover 4 and let it stand upon the bottom of the receiver 3, as shown in Fig. 2. In this case when the receiver is full to the top of the tank 7 the liquid overflows the edges of said tank 7 into the same, thus becoming exposed in a thin sheet to the entrapped gas. In this construction the pipes 30 and 28 and cooling-coil 31, connecting the same, are dispensed with.

By the apparatus thus described beer or other liquid can be dispensed in a thoroughly-cooled condition and at the same time free from surplus gas, but still without depriving it of life. On the contrary, if a certain barrel happens to be a trifle flat it will be enlivened in my apparatus and drawn fresh and cool with a rich creamy foam on it.

Having thus described the invention, what I claim as new is—

1. In an apparatus for dispensing gas-impregnated liquids, the combination of an ice-tank, a closed liquid-receiver in said ice-tank, a closed inner tank within said receiver and means for providing in the upper part of said inner tank an entrapped body of gas, means for forcing liquid from a supply cask or barrel into said receiver, a pipe leading from said receiver into the top of the inner tank, and a discharge-pipe leading from the lower part of said inner tank.

2. In an apparatus for dispensing gas-impregnated liquids, the combination of an ice-tank, a closed liquid-receiver in said ice-tank, an inner tank within said receiver and communicating therewith, means for securing a body of gas in the upper part of said inner tank, means for producing a flow of liquid from a supply cask or barrel into said receiver, and a discharge-pipe leading from the inner tank.

3. In an apparatus for dispensing gas-impregnated liquids, the combination of an ice-tank, a receiver in said ice-tank, an imperviously-fitting cover for said receiver, an inner closed tank depending from said cover, and adapted to contain an entrapped body of gas at its top, a vent-pipe extending into said inner tank, a liquid-supply pipe leading into the receiver and means for forcing liquid therethrough, a pipe leading out of said receiver and into the inner tank, and a discharge-pipe leading out of said inner tank, said pipes entering through the said cover of the receiver and being slidably mounted therein.

4. In an apparatus for dispensing gas-impregnated liquids, the combination with an ice-tank having an enlarged upper portion, a closed liquid-receiver in the lower part of said ice-tank, and an overflow-tank in said receiver, of a supply-pipe coiled around the upper part of said ice-tank, and leading into the receiver, an outlet-pipe from said receiver coiled around the upper portion of the ice-tank and opening into the overflow-tank, and a discharge-pipe leading from said overflow-tank and being also coiled in the said upper enlarged part of the ice-tank and leading to a draw-spigot.

5. In an apparatus for dispensing gas-impregnated liquids, the combination of an ice-tank, a closed liquid-receiver in the lower part of said tank, an overflow-tank within said receiver, supply and discharge pipes leading to and from said receiver and tank, said pipes being coiled in the upper part of the ice-tank, and means for securing a flow of liquid through said pipes.

6. In an apparatus for dispensing gas-impregnated liquids, the combination of an ice-tank, a closed liquid-receiver in said tank, an overflow-tank in said receiver, and forming therewith a narrow annular cooling-space, a slide-tube entering said receiver, means for supplying liquid through said tube, a second slide-tube entering said overflow-tank and being connected to the receiver to serve as an outlet therefrom, and a third slide-tube entering said overflow-tank and forming an outlet or liquid-discharge.

7. In an apparatus for dispensing gas-impregnated liquids, the combination of an ice-tank, a closed liquid-receiver in said tank, an overflow-reservoir within said receiver and forming therewith a narrow annular cooling-space, a liquid-supply pipe leading to the lower part of said receiver, a pipe connecting the upper part of said receiver to the upper part of said overflow-reservoir, and a discharge-pipe leading from the lower part of the overflow-reservoir.

8. In an apparatus for dispensing gas-impregnated liquids, the combination of a liquid-reservoir, means for supplying gas to the upper part of said reservoir, an upright vent-pipe slidably entering the top of said reservoir, a liquid-supplying pipe entering the upper part of said reservoir, and a discharge-pipe leading from the lower part of said reservoir.

9. In an apparatus for dispensing gas-impregnated liquids, the combination with a closed reservoir adapted to contain liquid at the bottom and gas at the top, of a supply-pipe leading from said reservoir and adapted to be inserted in a package, an air-tank and a gas-tank, a pipe connecting said tanks and having a valve 49, therein, a branch pipe leading from said connecting-pipe between the air-tank and said valve 49, and adapted to be connected to a package, and a branch pipe leading from said connecting-pipe intermediate of the gas-tank and valve 49, to the said reservoir.

10. In an apparatus for dispensing gas-impregnated liquids, the combination with a reservoir adapted to contain liquid at the bottom and gas at the top, means for supplying liquid by air-pressure, and means for supplying gas, of an air-check valve in the liquid-supply pipe comprising an upright chamber and a float-valve therein adapted to be seated at the bottom, and a gas-check valve also in the liquid-supply pipe and comprising an upright chamber having a downwardly-closing valve at the bottom.

11. In an apparatus for dispensing gas-impregnated liquids, the combination of a reservoir adapted to contain liquid at the bottom and gas at the top, a liquid-supply pipe an air-check valve in said supply-pipe comprising an upright chamber with a float-valve adapted to seat at the bottom of said chamber, a gas-check valve comprising a chamber having a valve adapted to close away from the reservoir, vent-valves connected one to each of said chambers and each comprising a chamber with a backwardly-closing valve therein, and a common relief-pipe to which said vent-valve chambers are connected.

In testimony that I claim the foregoing I have hereunto set my hand this 25th day of July, 1902.

EDWIN ADAM.

Witnesses:
CHARLES H. PELL,
C. B. PITNEY.